US011138356B1

(12) United States Patent
Potapov et al.

(10) Patent No.: US 11,138,356 B1
(45) Date of Patent: Oct. 5, 2021

(54) DEDICATED RECONFIGURABLE IP FOR EMULATION-BASED POWER ESTIMATION

(71) Applicant: Synopsys, Inc., Mountain View, CA (US)

(72) Inventors: Alex Potapov, Hopkinton, MA (US); Boris Gommershtadt, Mevaseret Zion (IL); Yan Zucker, Holon (IL)

(73) Assignee: Synopsys, inc., Mountain View, CA (US)

( * ) Notice: Subject to any disclaimer, the term of this patent is extended or adjusted under 35 U.S.C. 154(b) by 130 days.

(21) Appl. No.: 16/542,289

(22) Filed: Aug. 15, 2019

Related U.S. Application Data

(60) Provisional application No. 62/719,384, filed on Aug. 17, 2018.

(51) Int. Cl.
G06F 30/30 (2020.01)
G06F 30/331 (2020.01)
G06F 17/18 (2006.01)

(52) U.S. Cl.
CPC .......... G06F 30/331 (2020.01); G06F 17/18 (2013.01)

(58) Field of Classification Search
CPC ............................. G06F 30/331; G06F 17/18
USPC ........................................................ 716/136
See application file for complete search history.

(56) References Cited

U.S. PATENT DOCUMENTS

| 5,960,191 | A | * | 9/1999 | Sample | G01R 31/31717 703/28 |
| 8,108,194 | B2 | | 1/2012 | Zhu et al. | |
| 10,248,746 | B1 | * | 4/2019 | Bisht | G06F 30/33 |
| 10,621,296 | B1 | * | 4/2020 | Gommershtadt | G06F 11/3409 |
| 2006/0277509 | A1 | * | 12/2006 | Tung | G06F 30/331 716/109 |
| 2009/0271167 | A1 | * | 10/2009 | Zhu | G06F 30/331 703/14 |
| 2018/0137031 | A1 | * | 5/2018 | Jain | G06F 11/3652 |

FOREIGN PATENT DOCUMENTS

JP 2008234224 A 10/2008

OTHER PUBLICATIONS

Gaurav Jain, Accurate and Efficient Power estimation Flow for Complex SoCs, Design Reuse Magazine, Undated. Downloaded Mar. 4, 2019. (5 pages).
Zheng Wang, Power Modeling and Estimation during ADL-driven Embedded Processor Design, 2013 4th Annual International Conference on Energy Aware Computing Systems and Applications (ICEAC), Dec. 2013 (7 pages).

* cited by examiner

Primary Examiner — Jack Chiang
Assistant Examiner — Brandon Bowers
(74) Attorney, Agent, or Firm — Nicholson De Vos Webster & Elliott LLP; Judith Szepesi

(57) ABSTRACT

A power usage estimation system for a design emulated on a field programmable gate array (FPGA) comprising a periodic dump unit implementing statistical data sampling to generate a periodic dump without emulation stops and interactions with a host, and without affecting the emulation performance.

20 Claims, 5 Drawing Sheets

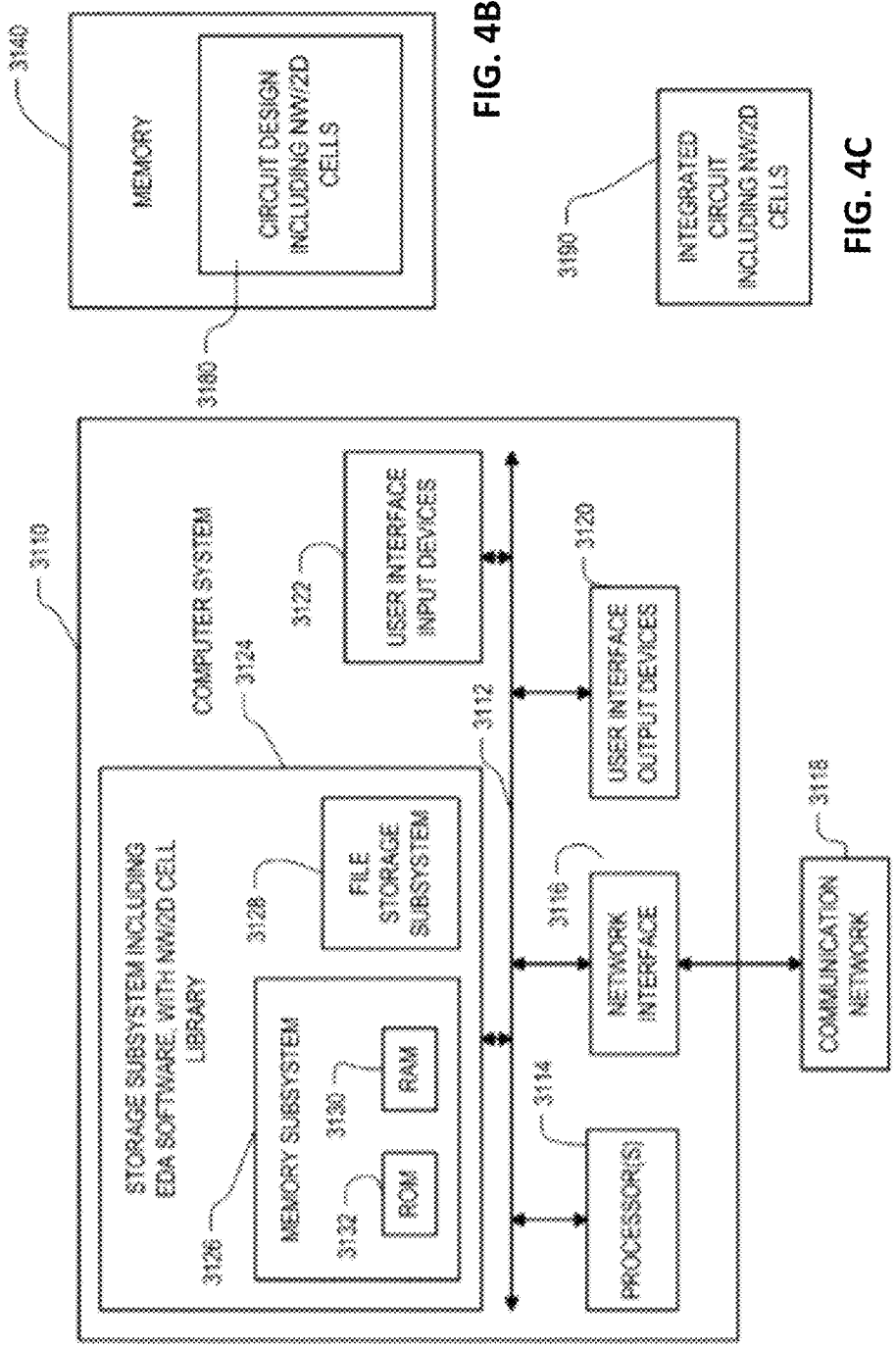

DEDICATED RECONFIGURABLE IP FOR EMULATION-BASED POWER ESTIMATION

RELATED APPLICATION

The present application claims priority to U.S. Provisional Application No. 62/719,384, filed on Aug. 17, 2018, and incorporates that prior application in its entirety.

FIELD

The present invention relates to power estimation, and more particularly the use of statistical data sampling in power estimation.

BACKGROUND

Emulation-based Power Estimation is a new area that does not have the proven approaches and industry standard tools. EDA vendors pay a lot of attention to this area and constantly work on the improving of performance and accuracy of their tools.

Emulation-based Power Estimation requires the dumping to the disk of very large number of design signals every emulation cycle. Typically, this data is sent by the emulator to the external host and then converted to the industry standard Switching Activity Interchange Format (SAIF). For each dumped signal SAIF contains its name and three integer numbers called TC, T0 and T1. The first number TC represents signal toggle count, i.e. the number of times that signal changes its value, while the numbers T0 and T1 represent the total time that signal has the logical values 0 and 1 respectively. The Power Estimation tool reads SAIF and computes the average power of the performed run.

A Power Estimation signal dump imposes heavy load on emulation and creates huge data traffic flows between the emulator and the remote host. All of these burdens result in drastic performance degradation during emulation. For the average modern circuit design, there are millions of signals that should be examined and dumped to the external host every sampling clock cycle, which reduces the total emulation performance from several MHz to several KHz, and respectively increases the total emulation runtime. This makes Power Estimation possible only for short runs, making it impractical or simple impossible for the most emulation tests and scenarios.

What others have failed to provide is a Power Estimation technique that significantly reduces the signal dumping activity needed for more efficient circuit Power Estimation during emulation. This failure is worse for large circuit designs and long emulation runs.

BRIEF DESCRIPTION OF THE FIGURES

The present invention is illustrated by way of example, and not by way of limitation, in the figures of the accompanying drawings and in which like reference numerals refer to similar elements and in which:

FIGS. 4A-4C are simplified block diagrams of a computer system suitable for use with embodiments of the technology, as well as circuit design and circuit embodiments of the technology.

Figure 1A:
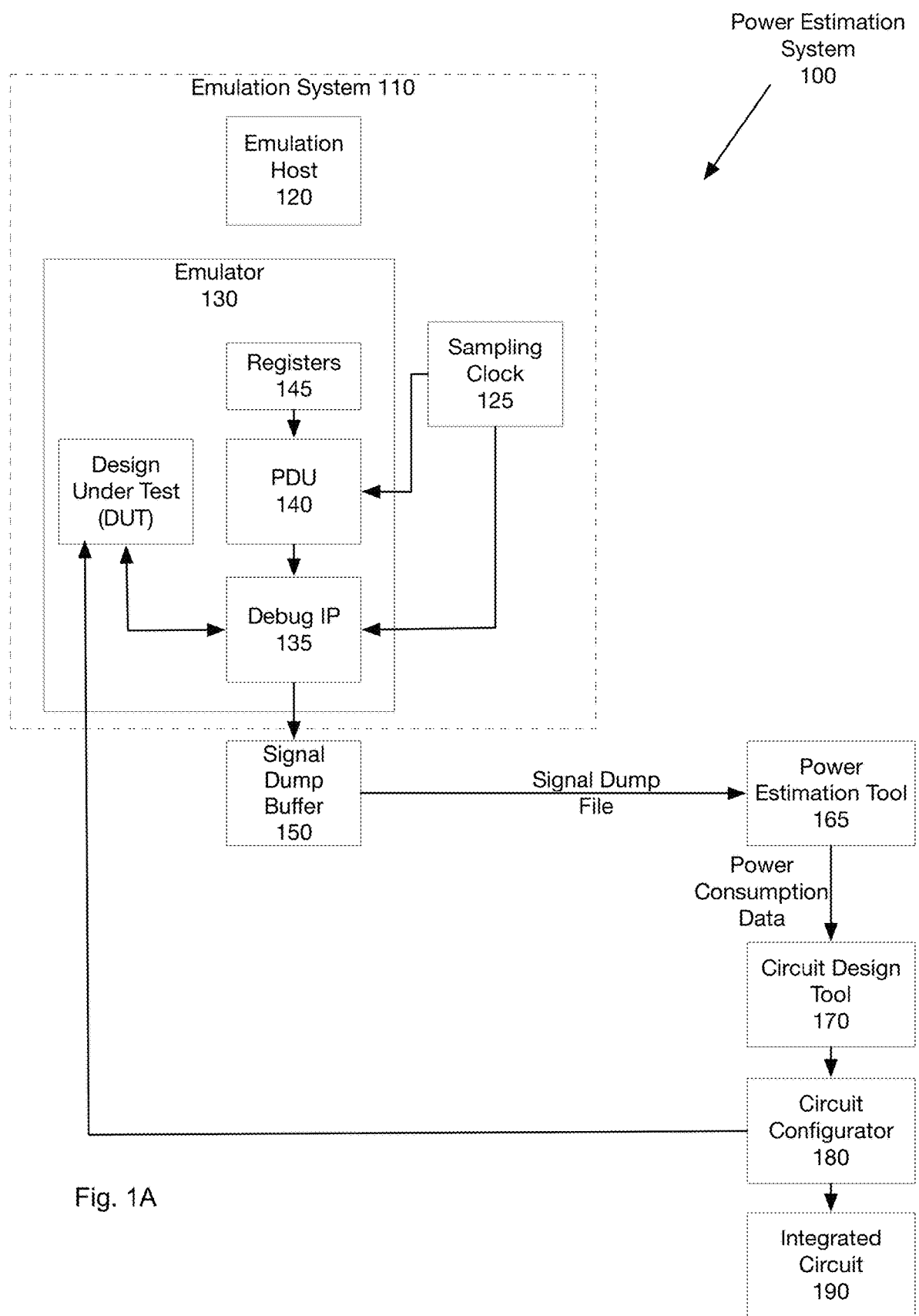
FIG. 1A is a block diagram of one embodiment of a system in which the present configurable IP logic may be implemented.

In such various figures, reference signs may be omitted as is consistent with accepted engineering practice; however, one of ordinary skill in the art will understand that the illustrated components are readily understood when viewed in context of the illustration as a whole and the accompanying disclosure describing such various figures.

DETAILED DESCRIPTION

In some of the embodiments disclosed herein, dedicated synthesizable hardware is used to more efficiently sample signal data for Power Estimation during emulation, for example, synthesizable hardware to be used inside of an EDA engineering tool such as Synopsys' ZeBu emulation system.

In some of the embodiments disclosed herein, the dedicated synthesizable hardware reduces the signal dumping activity by implementing statistical data sampling using special hardware that allows the generation of periodic dumps without periodic emulation stops and interactions with the host, and without effecting the emulation performance. The resulting hardware emulation rate will not be degraded by the periodic host interventions. In one embodiment, the design is emulated on an FPGA.

In some of the embodiments disclosed herein, the dedicated synthesizable hardware is configurable during emulation runtime for better correlation and Power Estimation accuracy.

The following detailed description of embodiments of the invention makes reference to the accompanying drawings in which like references indicate similar elements, showing by way of illustration specific embodiments of practicing the invention. Description of these embodiments is in sufficient detail to enable those skilled in the art to practice the invention. One skilled in the art understands that other embodiments may be utilized, and that logical, mechanical, electrical, functional and other changes may be made without departing from the scope of the present invention. The following detailed description is, therefore, not to be taken in a limiting sense, and the scope of the present invention is defined only by the appended claims.

In some of the embodiments disclosed herein, a statistical approach to the data sampling is used. To achieve a good correlation estimated power and actual power consumption, and obtain the accurate power estimation value, the sampling is periodically distributed along a time axis and should be dense, that is, without large time gaps.

In some of the embodiments disclosed herein, the signal dump is repeated according to the following pattern: signal dump for N1 emulation cycles is performed and not performed for N2 cycles. The number $U=N1/(N1+N2)*100\%$ signifies the 'dump utilization rate'. To obtain a better sampling density, N1 should be chosen as small as possible, but sufficiently large for providing good correlation with power usage.

Based on multiple benchmarks, N1=100 is recommended as the default value. In one embodiment, N1 is between 50 and 1000. N2 should be much larger than N1, but its value strongly depends on the emulated design and the emulation run duration. Benchmarks show that U=10% is almost always enough to get the good correlation with power. For many current circuit designs, with millions of signals and emulation scenarios that runs for tens or hundreds of millions of cycles, a recommended value for the dump utilization U is about 1-2%. Given the above equation, N2=100*N1/U−N1.

Thus, setting U at 10%, if N1=100, N2 would be 900. Setting U at 1%, if N1=100, N2 would be 9,900.

Traditionally, one can enable/disable the dump at runtime periodically directly from the emulation testbench that runs on the host and controls the emulation hardware. But this destroys emulation performance, because the emulation run needs to be halted to then pass the control to the host every sampling period. To overcome this issue let us consider closely how the emulation dump works. The dump is performed by the hardware components commonly called the Debug IP. Each Debug IP block has the clock pin connected to the sampling clock and the enable pin to turn the dump on/off. We will employ another approach that controls the Debug IP directly from the emulation hardware and not from the host.

FIG. 1A depicts one embodiment of the system described. The system includes an emulator 110 in which an emulator 130 implements the design under test (DUT), as well as a Periodic Dump Unit (PDU) 140, dedicated circuitry, that logically implements the periodic dump according to the user defined runtime configuration integer parameters (N1, N2). The PDU 140 controls the Debug IP 135 blocks using their enable pins and is driven by the same sampling clock 125 to work synchronously with them. The Debug logic 135 performs the signal dump, driven by their enable pins and the sampling clock 125. In one embodiment, the emulator 130 is a field programmable gate array (FPGA) which implements the design under test (DUT), as well as the hardware elements of the PDU 140 and Debug IP 135.

The signal dump in one embodiment is stored in dump signal buffer 150. Then signal dump data is sent to the host system 160 for analysis. In one embodiment, the signal dump data is converted to SAIF (Switching Activity Interchange Format) files that contain signal transition trace information. SAIF files support signals and ports for monitoring purposes.

The signal dump is used by power estimation tool 165 to provide power consumption estimation for the design under test. The power consumption data is used by the circuit design tool 170 to adjust the design of the design under test. In one embodiment, this estimation and redesign cycle may be run multiple times during the design phase. Other evaluations, such as timing evaluations and layout evaluations may also be done during this phase, as described below in connection with FIG. 3. Once the design is finalized, the circuit configurator 180 is used to create the final design for an integrated circuit 190, which has power usage characteristics adjusted based on the data from the signal dumps described above.

Figure 1B:
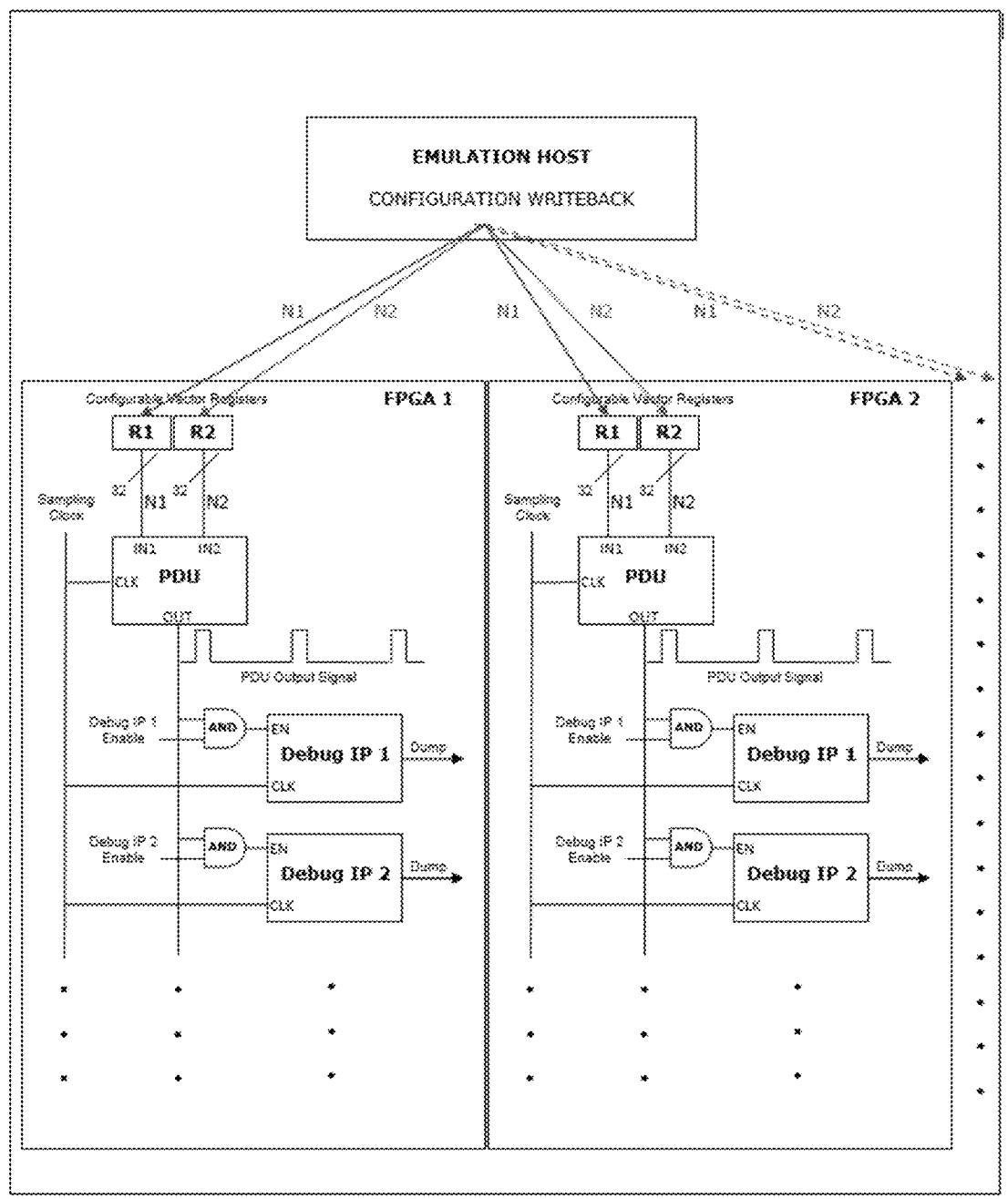
FIG. 1B depicts an architecture for one of the embodiments disclosed herein.

FIG. 1B illustrates one embodiment of the emulation circuitry. In one embodiment, the PDU module is synthesized at the design compilation stage according to the following logical functionality:

```
module PDU(input bit CLK, input bit [31:0] IN1, IN2,
        output bit OUT);
    bit [31:0] CTR = 0;
    always @(posedge CLK) begin
        if (CTR >= IN1 + IN2)
            CTR = 0;
```

-continued

```
        If (CTR < IN1) OUT <= 1;
        Else              OUT <= 0;
        CTR++;
    end
endmodule : PDU
```

The PDU module works synchronously with the Debug IP blocks by being driven by the same sampling clock. In one embodiment, the PDU module controls the enable pin of each Debug IP block indirectly. In one embodiment, the netlist enable signal connected to this pin is disconnected, and a logical AND operation is performed between this signal and the PDU output signal (OUT). Then, the resulting signal is connected to the enable pin of the Debug IP block. This means that the enable pin is ON only when both the netlist enable signal and the PDU output signal are ON.

In one embodiment, the PDU module is reconfigurable at runtime: its vector inputs IN1 and IN2 are connected to the configurable vector registers R1 and R2 of the same size that constantly hold integer values N1 and N2 respectively. In one embodiment, the registers R1 and R2 are implemented as arrays of self-looped flip-flops that can be configured using runtime writeback from the emulation host to the emulator. The default configuration N1=1 and N2=0 means the usual full dump with U=100% utilization.

To avoid the timing issues between FPGAs, in one embodiment a separate PDU module and associated pair of configurable vector registers R1 and R2 are generated per each FPGA that contains the Debug IP blocks. The generated PDU module controls all the Debug IP blocks of the corresponding FPGA. The result of the dumps is used to analyze the power consumption of the design under test, as various tasks are executed on the design under test.

Figure 2:
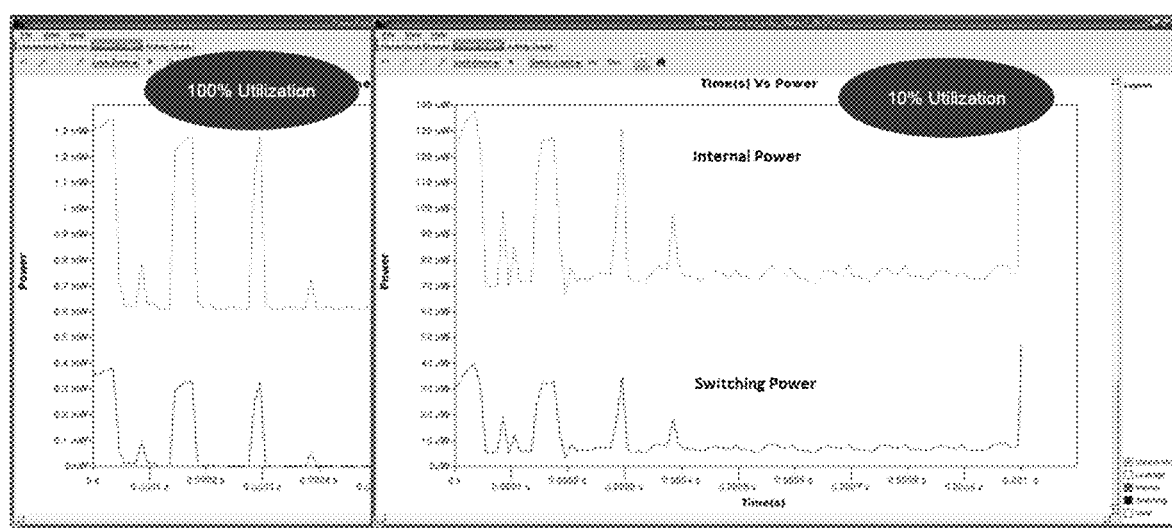
FIG. 2 depicts Power Estimation using two different sampling rates.

FIG. 2 shows two exemplary power profiles of the small design emulated for 100K cycles: the first profile was obtained using full dump with U=100% and the second one was obtained using periodical dump with U=10%. Both profiles are derived from 100 points where each point represents the window of 1K cycles.

For each such window the separate SAIF file was created. Based on this SAIF, the Power Estimation tool computed two values: the average switching power (shown in blue) and the average internal power (shown in green) that together constitute the average total power for this window. Despite the small design size and short run duration, one can observe the strong correlation and the good accuracy of the statistical profile (U=10%) with respect to the reference full dump profile (U=100%).

Figure 3:
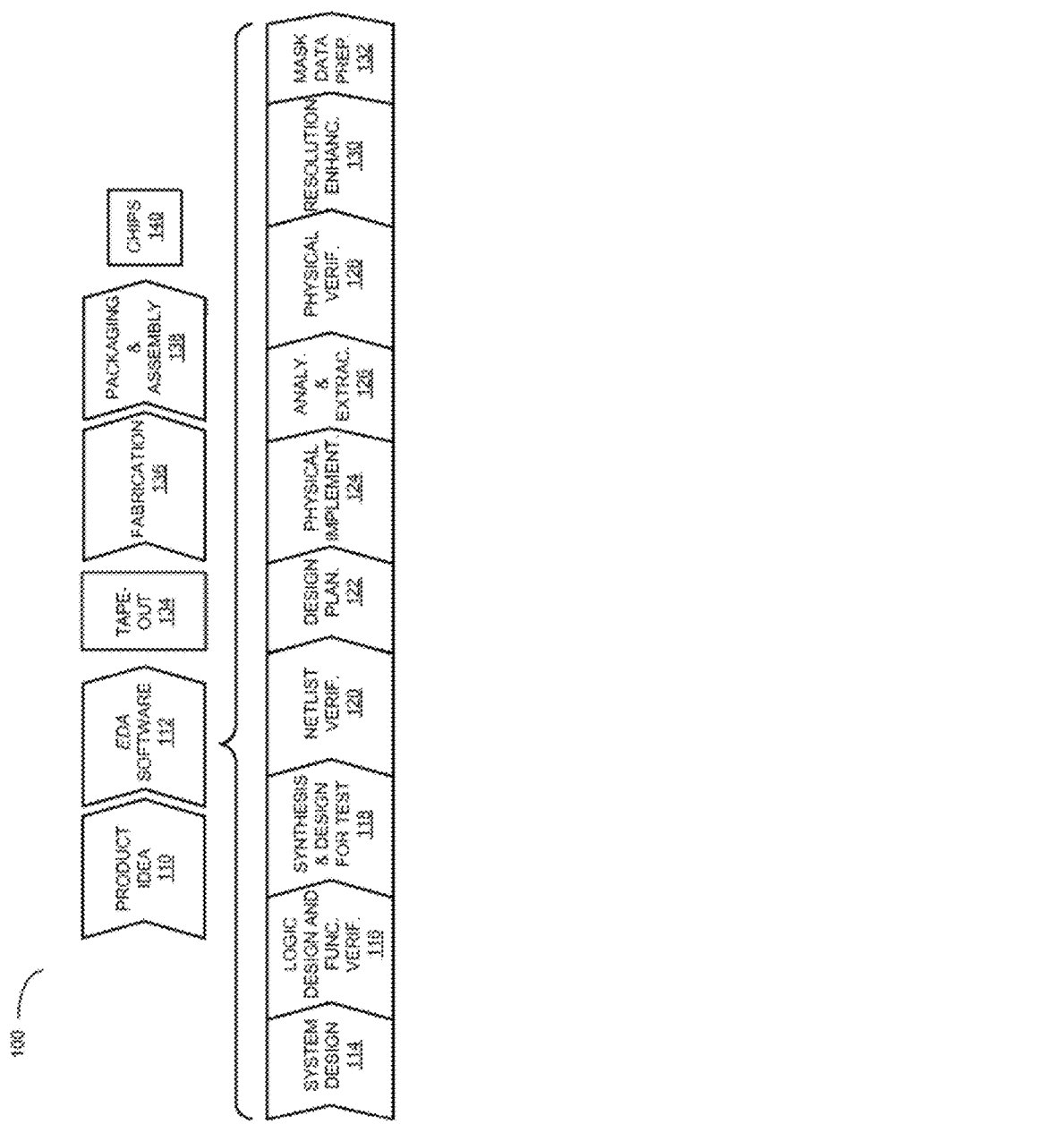
FIG. 3 a flowchart illustrating various operations in the design and fabrication of an integrated circuit in accordance with an embodiment of the present disclosure.

FIG. 3 illustrates various processes performed in the design, verification and fabrication of an item of manufacture such as an integrated circuit using software tools with a computer, and possibly special hardware-assisted tools, to transform and verify design data and instructions that represent the integrated circuit. These processes start with the generation of a product idea (110) with information supplied by a designer, information which is transformed during a process to create an item of manufacture (referred to herein as a design or device) that uses EDA software tools (112), which may also be signified herein as EDA software, as a design tool or a verification tool. When the design is finalized, it can be taped-out (134), which typically is when artwork for the integrated circuit is sent to a fabrication facility. After tape-out, a semiconductor die is fabricated (136) and packaging and assembly processes (138) are performed, which result in the finished integrated circuit (140) which may also be signified herein as a circuit, device, component, chip or SoC (System on Chip).

Items of manufacture, for example, a circuit or system are used in commerce at a variety of levels of abstraction ranging from low-level transistor layouts to high-level description languages. Most designers start at high-level of abstraction to design their circuits and systems, using a hardware description language (HDL) such as VHDL, Verilog, SystemVerilog, SystemC, MyHDL or OpenVera. The high-level HDL is easier for developers to comprehend, especially for a vast system, and may describe highly complex concepts that are difficult to grasp using a lower level of abstraction. The HDL description may be converted into other levels of abstraction as is helpful to the developers. For example, a high-level description may be converted to a logic-level register transfer level (RTL) description, a gate-level (GL) description, a layout-level description, or a mask-level description. Each lower abstraction level introduces more detail into the design description. The lower-levels of abstraction may be generated automatically by computer, derived from a design library, or created by another design automation technique. An example of a specification language at a lower level of abstraction is SPICE, much used detailed descriptions of analog-based circuits.

A design process that uses EDA software tools (112) includes tasks 114-132, which are described below. This design flow description is for illustration purposes only and is not meant to limit the present disclosure. For example, an actual integrated circuit design may require a designer to perform the design operations in a different sequence than the sequence described herein.

During system design (114), a designer describes the functionality to be manufactured. The designer can also perform what-if planning to refine the functionality and to check costs. Note that hardware-software architecture partitioning can occur at this stage. Exemplary EDA software products from Synopsys, Inc. of Mountain View, Calif. that can be used at this stage include: Model Architect, Saber, System Studio, and Designware products.

During logic design and functional verification (116), modules in the circuit are specified in one or more hardware description languages, or HDLs, and the design in HDL is checked for functional accuracy. More specifically, the design is checked to ensure that it produces the correct outputs. Exemplary HDL languages are Verilog, VHDL and SystemC. Functional verification is typically done by using software-based simulators and other tools such as testbench generators, static HDL checking tools and formal verification tools. In some situations, special hardware referred to as 'emulators' or 'prototyping systems' are used to speed up the functional verification. Exemplary EDA software products from Synopsys, Inc. of Mountain View, Calif. that can be used at this stage include: VCS, Vera, Designware, Magellan, Formality, ESP and Leda products. Exemplary emulator and prototyping products also available from Synopsys that can be used at this state include: Zebu® and Protolink®.

During synthesis and design for test (118), VHDL/Verilog code is translated to a netlist. This netlist can be optimized for the target technology. Additionally, tests can be designed and implemented to check the finished integrated circuit. Exemplary EDA software products from Synopsys, Inc. of Mountain View, Calif. that can be used at this stage include: Design Compiler, Physical Compiler, Test Compiler, Power Compiler, FPGA Compiler, Tetramax, and Designware products.

During netlist verification (120), the netlist is checked for compliance with timing constraints and for correspondence with the VHDL/Verilog code. Exemplary EDA software products from Synopsys, Inc. of Mountain View, Calif. that can be used at this stage include: Formality, Primetime, and VCS products.

During design planning (122), an overall floor plan for the integrated circuit is constructed and analyzed for timing and top-level routing. Exemplary EDA software products from Synopsys, Inc. of Mountain View, Calif. that can be used at this stage include: Astro and IC Compiler products.

During layout implementation (124), the placement (positioning of circuit elements such as transistors or capacitors) and routing (connection of the same by a plurality of conductors) occurs. Exemplary EDA software products from Synopsys, Inc. of Mountain View, Calif. that can be used at this stage include: the Astro and IC Compiler products.

During analysis and extraction (126), the circuit function is verified at the layout level, which permits refinement of the layout design. Exemplary EDA software products from Synopsys, Inc. of Mountain View, Calif. that can be used at this stage include: Astrorail, Primerail, Primetime, and Star RC/XT products.

During physical verification (128), the layout design is checked to ensure correctness for manufacturing constraints such as DRC constraints, electrical constraints, lithographic constraints, and circuitry function matching the HDL design specification. Exemplary EDA software products from Synopsys, Inc. of Mountain View, Calif. that can be used at this stage include the Hercules product.

During resolution enhancement (130), geometric manipulations of the layout are performed to improve manufacturability of the design. Exemplary EDA software products from Synopsys, Inc. of Mountain View, Calif. that can be used at this stage include: *Proteus* products.

During mask-data preparation (132), the 'tape-out' data for production of masks to produce finished integrated circuits is provided. Exemplary EDA software products from Synopsys, Inc. of Mountain View, Calif. that can be used at this stage include the CATS family of products.

For all of the above-mentioned integrated circuit design tools, similar tools from other EDA vendors, such as Cadence, Siemens, other corporate entities or various non-commercial tools from universities, or open source repositories, can be used as an alternative.

Embodiments of the present disclosure can be used during emulation (116). Specifically, some embodiments of the present disclosure can be used in EDA software (112).

A storage subsystem is preferably used to store the programs and data structures that provide the functionality of some or all of the EDA tools described herein, and tools applied for development of cells for the library and for physical and logical design using the library. These programs and data structures are generally executed by one or more processors in a manner known to those of ordinary skill in the art.

FIGS. 4A-4C are simplified block diagrams of a computer system suitable for use with embodiments of the technology, as well as circuit design and circuit embodiments of the technology.

Computer system 3110 typically includes at least one computer or processor 3114 which communicates with a number of peripheral devices via bus subsystem 3112. Typically, the computer can include, or the processor can be, any of a microprocessor, graphics processing unit, or digital signal processor, and their electronic processing equivalents, such as an Application Specific Integrated Circuit (ASIC) or Field Programmable Gate Array (FPGA). The terms 'processor' and 'computer' are further defined below. These peripheral devices may include a storage subsystem 3124, comprising a memory subsystem 3126 and a file storage subsystem 3128, user interface input devices 3122, user interface output devices 3120, and a network interface subsystem 3116. The input and output devices allow user interaction with computer system 3110.

The computer system may be a server computer, a client computer, a workstation, a mainframe, a personal computer (PC), a tablet PC, a set-top box (STB), a personal digital assistant (PDA), a cellular telephone, a smartphone, a web appliance, a kiosk, a television, a game station, a network router, switch or bridge, or any data processing machine capable of executing instructions 124 (sequential or otherwise) that specify actions to be taken by that machine. The computer system typically includes an operating system, such as Microsoft's Windows, Apple Computer's Mac OS, Linux or Unix.

Innovations, embodiments and/or examples of the claimed inventions are neither limited to conventional computer applications nor the programmable apparatus that run them. For example, the innovations, embodiments and/or examples of the claimed inventions can include an optical computer, quantum computer, analog computer, or the like. The computer system may be a multi-processor or multi-core system and may use or be implemented in a distributed or remote system. The term 'processor' here is used in the broadest sense to include a singular processor and multi-core or multi-processor arrays, including graphic processing units, digital signal processors, digital processors and combinations of these devices. Further, while only a single computer system or a single machine may be illustrated, the use of a singular form of such terms shall also signify any collection of computer systems or machines that individually or jointly execute instructions 124 to perform any one or more of the sets of instructions discussed herein. Due to the ever-changing nature of computers and networks, the description of computer system 3110 depicted in FIG. 4A is intended only as one example for purposes of illustrating the preferred embodiments. Many other configurations of computer system 3110 are possible having more or less components than the computer system depicted in FIG. 4A.

Network interface subsystem 3116 provides an interface to outside networks, including an interface to communication network 3118, and is coupled via communication network 3118 to corresponding interface devices in other computer systems or machines. Communication network 3118 may comprise many interconnected computer systems, machines and communication links. These communication links may be wireline links, optical links, wireless links, or any other devices for communication of information. Communication network 3118 can be any suitable computer network, for example a wide area network such as the Internet, and/or a local area network such as Ethernet. The communication network can be wired and/or wireless, and the communication network can use encryption and decryption methods, such as is available with a virtual private network.

User interface input devices 3122 may include an alphanumeric keyboard, pointing devices such as a mouse, trackball, touchpad, stylus, or graphics tablet, a scanner, a touchscreen incorporated into the display, audio input devices such as voice recognition systems, microphones, and other types of input devices. In general, use of the term "input device" is intended to include all possible types of devices and ways to input information into computer system 3110 or onto communication network 3118.

User interface output devices 3120 may include a display subsystem, a printer, a fax machine, or non-visual displays such as audio output devices. The display subsystem may include a cathode ray tube (CRT), a flat-panel device such as a liquid crystal display (LCD), a projection device, or some other device for creating a visible image such as a virtual reality system. The display subsystem may also provide non-visual display such as via audio output or tactile output (e.g., vibrations) devices. In general, use of the term "output device" is intended to include all possible types of devices and ways to output information from computer system 3110 to the user or to another machine or computer system.

Memory subsystem 3126 typically includes a number of memories including a main random-access memory (RAM) 3130 (or other volatile storage device) for storage of instructions and data during program execution and a read only memory (ROM) 3132 in which fixed instructions are stored. File storage subsystem 3128 provides persistent storage for program and data files, and may include a hard disk drive, a floppy disk drive along with associated removable media, a CD-ROM drive, an optical drive, a flash memory, or removable media cartridges. The databases and modules implementing the functionality of certain embodiments may be stored by file storage subsystem 3128.

Bus subsystem 3112 provides a device for letting the various components and subsystems of computer system 3110 communicate with each other as intended. Although bus subsystem 3112 is shown schematically as a single bus, alternative embodiments of the bus subsystem may use multiple busses. For example, RAM-based main memory can communicate directly with file storage systems using Direct Memory Access (DMA) systems.

FIG. 4B shows a memory 3140 such as a non-transitory, computer readable data and information storage medium associated with file storage subsystem 3128, and/or with network interface subsystem 3116, and can include a data structure specifying a circuit design. The memory 3140 can be a hard disk, a floppy disk, a CD-ROM, an optical medium, removable media cartridge, or other medium that stores computer readable data in a volatile or non-volatile form. Software read into a computer from such a memory can be converted at a selected instance in time from a tangible form to a transmission signal that is propagated through a medium (such as a network, connector, wire, or trace as an electrical pulse or a medium such as space or an atmosphere as electromagnetic radiation with wavelengths in the electromagnetic spectrum longer than infrared light).

FIG. 4C is a block representing an integrated circuit 3190 created with the described technology that includes one or more cells selected, for example, from a cell library.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

We claim:

1. A power usage estimation system comprising an emulator comprising:
    a periodic dump unit implementing statistical data sampling to generate a periodic dump, the periodic dump based on a utilization rate U, without emulation stops and interactions with a host, and without affecting the emulation performance, where U is determined by the periodic dump unit to be U=N1/(N1+N2), where N1 is a number of cycles during which dumps are performed and N2 is a number of cycles during which dumps are not performed.

2. The system of claim 1, wherein the utilization rate is between 1% and 10%.

3. The system of claim 1, wherein the periodic dump unit is reconfigurable at runtime, by adjusting the values N1 and N2, where N1 and N2 are user-provided values.

4. The system of claim 1, further comprising two configurable registers to hold the values N1 and N2.

5. The system of claim 4, wherein the two configurable registers are implemented as arrays of self-looped flip-flops configured using runtime writeback from the host.

6. The system of claim 1, wherein the emulator is a field programmable gate array (FPGA) implementing a design under test and the periodic dump unit.

7. The system of claim 6, wherein the emulator comprises a plurality of FPGA units, and a periodic dump unit is implemented in each of the plurality of FPGA units.

8. The system of claim 1, wherein the utilization rate U is used during an entire period of circuit emulation.

9. A method of providing power usage estimation for a design that is emulated on a field programmable gate array (FPGA) comprising:
determining by a periodic dump unit a utilization rate U, indicating a frequency of sampling by the periodic dump unit, where U is determined to be U=N1/(N1+N2), N1 is a number of cycles during which dumps are performed, and N2 is a number of cycles during which dumps are not performed;
generating a periodic dump by the periodic dump unit based on the utilization rate U without emulation stops and interactions with a host, and without affecting the emulation performance.

10. The method of claim 9, wherein the utilization rate is between 1% and 10%.

11. The method of claim 9, further comprising:
reconfiguring the periodic dump unit at runtime by adjusting N1 and N2, where N1 and N2 are user-provided values.

12. The method of claim 9, further comprising two configurable registers to hold the values N1 and N2, wherein the two configurable registers are implemented as arrays of self-looped flip-flops configured using runtime writeback from the host.

13. The method of claim 9, wherein an emulator comprises a plurality of FPGA units, and each of the FPGA units implements a periodic dump unit.

14. The system of claim 9, wherein the utilization rate U is used during an entire period of circuit emulation.

15. A power estimation system comprising:
an emulator comprising a field programmable gate array, the emulator comprising:
a design under test;
a periodic dump unit implementing statistical data sampling to generate a periodic dump of signals of the design under test, based on a utilization rate U, without emulation stops and interactions with a host, and without affecting the emulation performance, the periodic dump unit determining the utilization rate U, indicating a frequency of sampling by a periodic dump unit, where U is determined to be U=N1/(N1+N2), N1 is a number of cycles during which dumps are performed, and N2 is a number of cycles during which dumps are not performed; and
a register to store the utilization rate U indicating a ratio of a cycles during which dumps are performed to cycles during which dumps are not performed.

16. The system of claim 15, wherein the utilization rate is between 1% and 10%.

17. The system of claim 16, wherein the periodic dump unit is reconfigurable at runtime, by adjusting the values N1 and N2, where N1 and N2 are user-provided values.

18. The system of claim 16, wherein the register comprises:
two configurable registers to hold values N1 and N2 defining the utilization rate;
wherein the two configurable registers are implemented as arrays of self-looped flip-flops configured using runtime writeback from the host.

19. The system of claim 15, further comprising:
a power estimation tool to utilize the signal dump data to calculate power consumption of the design under test, the power consumption used in designing an integrated circuit based on results of the emulation.

20. The system of claim 15, wherein the utilization rate U is used during an entire period of circuit emulation.

* * * * *